US006748295B2

(12) United States Patent
Tilles et al.

(10) Patent No.: US 6,748,295 B2
(45) Date of Patent: Jun. 8, 2004

(54) ITEM DELIVERY AND RETRIEVAL SYSTEM

(75) Inventors: David J. Tilles, Woodstock, MD (US); David J. Janos, Ellicott City, MD (US); Mark T. Neebe, Catonsville, MD (US); Bruce G. Chestnutt, Sykesville, MD (US); Ann C. Schofield, Ellicott City, MD (US); Randall K. Neilson, Crownsville, MD (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/817,375

(22) Filed: Mar. 27, 2001

(65) Prior Publication Data

US 2002/0032501 A1 Mar. 14, 2002

Related U.S. Application Data

(60) Provisional application No. 60/265,875, filed on Feb. 5, 2001, and provisional application No. 60/220,842, filed on Jul. 26, 2000.

(51) Int. Cl.[7] .......................... G06F 17/00; G06F 7/00

(52) U.S. Cl. ...................... 700/241; 700/242; 700/230; 700/216; 700/215; 340/568.1

(58) Field of Search ......................... 700/214; 340/569, 340/825

(56) References Cited

U.S. PATENT DOCUMENTS 4,072,825 A * 2/1978 McLay et al. ............ 179/18 B
4,950,118 A * 8/1990 Mueller et al. ............. 414/274
5,113,351 A 5/1992 Bostic (List continued on next page.)

FOREIGN PATENT DOCUMENTS

| | | |
|---|---|---|
| EP | 0 821 518 A | 1/1998 |
| EP | 0 845 747 A2 | 1/1998 |
| FR | 2 621 803 A | 4/1989 |
| FR | 2 643 479 A | 8/1990 |

OTHER PUBLICATIONS

REMSTAR catalog, showing various retrieval units.
Hanel's carousel publication, showing automatic compartment doors on a storage/retrieval unit.

*Primary Examiner*—Donald P Walsh
*Assistant Examiner*—Michael E. Butler
(74) *Attorney, Agent, or Firm*—Birch, Stewart, Kolasch & Birch, LLP

(57) ABSTRACT

An item delivery and retrieval system including a storage subsystem and a computer subsystem. The storage subsystem includes a secure enclosure having an item storage carousel including internal controller apparatus. The computer subsystem is embodied in internet web page based customized application software for implementing an application interface of selectively configurable ActiveX controls for providing user access, such as an employee of a delivery service company and/or a customer of the delivery service company and customer access to one or more storage bins located behind a set of normally closed doors, for providing access control to the bins, and for managing the location of the items in the storage subsystem. The doors are opened when proper identification is provided by the customer so as to permit retrieval of items located in specifically designated bin(s) or to return items thereto.

35 Claims, 8 Drawing Sheets

U.S. PATENT DOCUMENTS

| | | | | | |
|---|---|---|---|---|---|
| 5,273,183 | A | * | 12/1993 | Tuttobene | 221/7 |
| 5,385,265 | A | | 1/1995 | Schlamp | |
| 5,386,462 | A | | 1/1995 | Schlamp | |
| 5,389,919 | A | * | 2/1995 | Warren et al. | 340/825.31 |
| 5,467,892 | A | | 11/1995 | Schlamp | |
| 5,499,707 | A | * | 3/1996 | Steury | 235/381 |
| 5,544,996 | A | | 8/1996 | Castaldi et al. | |
| 5,645,390 | A | * | 7/1997 | Filberti et al. | 414/390 |
| 5,671,362 | A | * | 9/1997 | Cowe et al. | 395/228 |
| 5,774,053 | A | | 6/1998 | Porter | |
| 5,820,237 | A | | 10/1998 | Robey | |
| 5,836,662 | A | | 11/1998 | Robey | |
| 5,890,136 | A | * | 3/1999 | Kipp | 705/22 |
| 5,902,027 | A | | 5/1999 | Robey et al. | |
| 5,915,909 | A | | 6/1999 | Smith | |
| 6,010,239 | A | * | 1/2000 | Hardgrave et al. | 364/487.01 |
| 6,016,064 | A | * | 1/2000 | Saeki | 235/375 |
| 6,064,979 | A | * | 5/2000 | Perkowski | 705/26 |
| 6,123,223 | A | * | 9/2000 | Watkins | 221/121 |
| 6,259,367 | B1 | * | 7/2001 | Klein | 340/572.1 |
| 6,331,812 | B1 | * | 12/2001 | Dawalibi | 340/5.2 |
| 6,344,796 | B1 | * | 2/2002 | Ogilvie et al. | 340/568.1 |
| 6,356,941 | B1 | * | 3/2002 | Cohen | 709/219 |
| 6,404,337 | B1 | * | 6/2002 | Van Till et al. | 340/569 |
| 6,456,900 | B1 | * | 9/2002 | Kakuta | 700/233 |
| 2003/0052778 | A1 | * | 3/2003 | Wong | 340/540 |

* cited by examiner

ITEM DELIVERY AND RETRIEVAL SYSTEM

ORIGIN OF THE INVENTION

This application is a non-provisional application including the subject matter and claiming the priority dates of Provisional Application No. Serial No. 60/220,842, filed on Jul. 26, 2000 and Provisional Application Serial No. 60/265,875 filed on Feb. 5, 2001, the contents of which are meant to be incorporated herein by reference.

BACKGROUND OF THE INVENTION

This invention relates generally to item storage and retrieval systems and more particularly to a web-enabled item storage and retrieval system including a secure enclosure which is controlled by computer apparatus employing browser technology type software.

The overnight delivery business is a highly competitive business, requiring delivery companies to develop innovative approaches to reduce delivery cost and increase customer satisfaction. With today's lifestyles, persons, i.e., customers, are frequently not at home to accept deliveries and/or it is inconvenient to return items. Thus there is a need for eliminating the requirement of couriers, meaning persons employed by a delivery company to make a delivery to a customer, to make multiple visits to the same residence or small business in order to complete delivery transaction(s).

Accordingly, there is a need for a secure item and delivery and return system which permits a customer to retrieve undelivered items or return items at any hour of the day, seven days a week. Typically, a customer receives some type of notification that an undeliverable item is stored at a remote location where there is located an item delivery and retrieval system. When it is convenient, the customer subsequently travels to the location of the system and retrieves the items. The benefits of such a system include labor savings, increased customer satisfaction, improved traceability, and improved process control and item security.

SUMMARY

Accordingly, it is an object of the present invention to provide a method and apparatus for storing items of various types, sizes and shapes for subsequent retrieval or return when an initial delivery was unsuccessful.

It is a further object of the invention to provide an item delivery and retrieval system which is operable in multiple utilization scenarios.

It is yet another object of the invention to provide an item delivery and retrieval system which is accessible on demand by either delivery and/or storage clerks (employees), and clients (customers) wishing to store or retrieve undelivered items.

It is a further object of the invention to provide an item delivery and retrieval system which provides a requisite amount of security for items stored therein while providing relatively easy and user friendly access.

And it is still a further object of the invention to provide an item delivery and retrieval system which is controlled by application configurable digital computer apparatus supporting browser and web page software.

The foregoing and other objects are achieved by a storage subsystem and a computer subsystem. The storage subsystem provides a secure items storage and delivery environment including a secure enclosure having an item storage carousel including controller apparatus as well as a set of sensors. The computer subsystem is embodied in web page based customized application software for implementing an application interface of selectively configurable application interface controls, such as ActiveX controls, for providing user access to one or more storage bins located behind a set of normally closed doors which are selectively opened and then closed for item storage and retrieval, provides access control to the bins, and manages the location of the items in the storage sub-system. The doors are opened when proper identification is provided by a user so as to permit access only to specifically designated bin(s).

Further scope of applicability of the present invention will become apparent from the detailed description provided hereinafter. It should be understood, however, that the detailed description and specific example, while disclosing the preferred embodiment of the invention, is given by way of illustration only, since various changes and modifications within the spirit and scope of the invention will become apparent to those skilled in the art from the following detailed description.

BRIEF DESCRIPTION OF THE DRAWINGS

The present invention will become more fully understood when the detailed description provided hereinbelow is considered together with the accompanying drawings which are provided by way of illustration only and are thus not meant to be limitative of the subject invention and wherein.

DETAILED DESCRIPTION OF THE INVENTION

Item delivery companies incur a high cost to make multiple deliveries at one location if a customer is not at home. The high cost results from: redeliveries that increase the delivery expense through additional man-hours and use of valuable space on a delivery truck; deliveries left at the delivery point without any signature are subject to theft, damage and lack delivery verification; and there is no method to handle returns. The customer also has concerns about the deliveries, namely: redeliveries are inconvenient; deliveries are difficult to schedule and wait for re-delivery; there are concerns about theft and weather damage to packages; and returning is a time-consuming and often irritable task.

Furthermore, delivery companies are belabored with item process control, typically: significant labor hours to hand-write left notices, e.g., first delivery attempt, second notice attempt, or final notice prior to returning to sender; the lack of visibility of the item while in the on-delivery, re-delivery, or return to sender life-cycle; manual process generates significant hard copy content to manage, store, protect and archive; and, hard copies are cumbersome to obtain quick visibility.

In accordance with the problems briefly referred to above, this invention is directed to an item delivery and retrieval system (IDRS) which stores a variety of products and items from post cards to large packages. The system may be installed in three scenarios: (1) behind the customer service counter for operation by employees; (2) free standing in a public access location for access by both the employees or customers; or (3) wall mounted in a public location as a customer operated system. If wall mounted, the front of the IDRS is accessible by customers in a common area or lobby, while the rear of the IDRS is accessible by employees/clerks for behind the scenes loading of items.

The IDRS in accordance with this invention is comprised of a single sided or a double sided storage subsystem and a computer subsystem. The storage subsystem provides secure item storage and delivery. The computer subsystem includes separate customer and employee interfaces, provides access control, and manages the location of items in the storage subsystem.

When necessary, multiple IDRS(s) may be co-located at a single facility, allowing the delivery company to configure the system based on site requirements. Multiple IDRS systems can be integrated, when desirable, with multiple storage and computer subsystems for efficiently serving a higher volume of items and customers.

Figure 1:
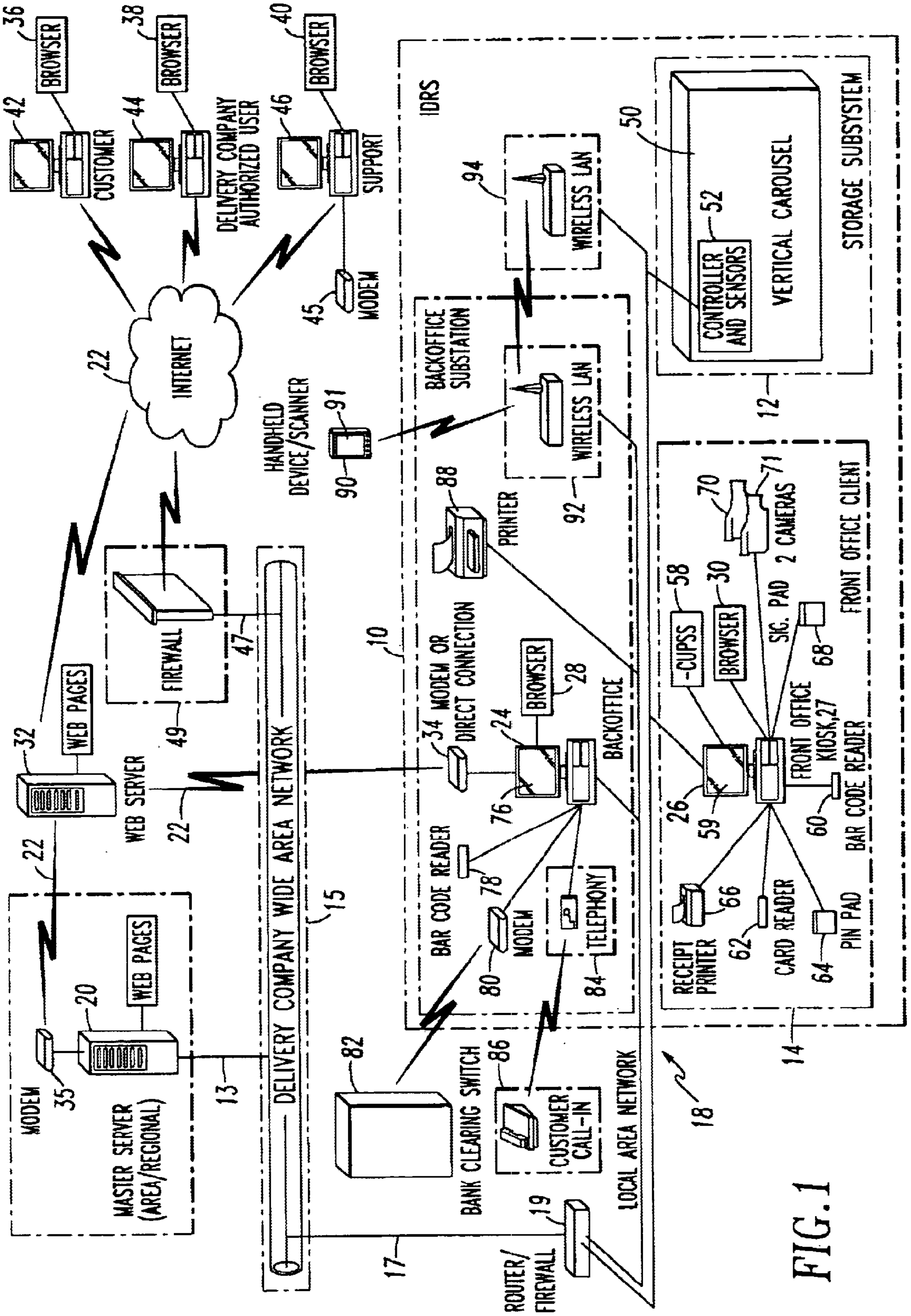
FIG. 1 is a block diagram broadly illustrative of the system architecture of an item delivery and retrieval system (IDRS) in accordance with the subject invention.

Referring now to the drawings wherein like reference numerals refer to like components throughout, FIG. 1 is broadly illustrative of the architecture for an IDRS system 10 including, among other things, a storage subsystem 12 and a computer subsystem embodied in a front office client module 14 and a back office module 16, both of which includes state of the art computer apparatus with application configurable software, such as a browser, which is internet web page based. These elements are interconnected by means of a local area network (LAN) 18 and a router/firewall 19.

As shown in FIG. 1, a master server 20 supports and stores set(s) of web pages. They are connected via a direct network connection 17 from a company wide area network 15 and connection 13 to user access terminals 24 and 26 supporting web browsers 28 and 30 located in the front office client module 14 and back office module 16.

Additionally, the master server 20 supports and stores set(s) of web pages that are connected via the internet 22 to a web server 32. The web server 32 is a pass through connection via the internet 22 to user access terminals 24 and 26 supporting web browsers 28 and 30 located in the front office client 14 and back office module 16. A modem 34 connects the user access terminals 24 and 26 to the web server 32. A modem 35 connects the master server 20 to the web server 32.

Figure 2A:
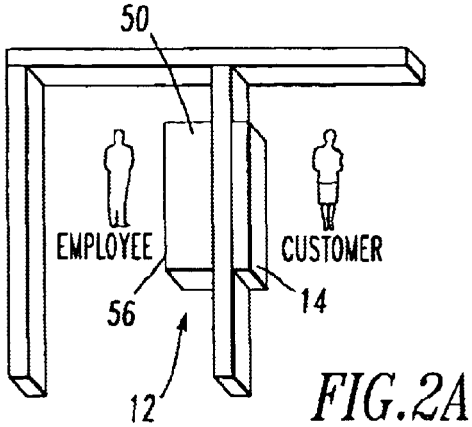
FIGS. 2A and 2B are illustrative of double sided and single sided item delivery and retrieval configurations of an IDRS in accordance with the subject invention.
Figure 2B:
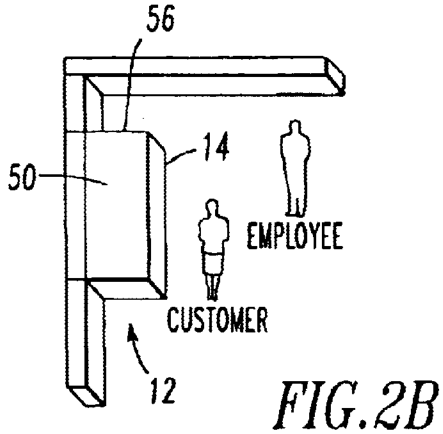

As illustrated, the front office browser software 30 and the back office browser software 28 reside in separate user access terminals 26 and 24. This would be the case for double sided load and retrieve system as shown in FIG. 2A; however, in a single sided system as shown in FIG. 2B, the front office browser software 30 and the back office browser software 28 would reside in a common terminal, i.e., the front office client terminal 26 which is in the form of a kiosk 27, shown in FIG. 4, and which is associated with the front office client module 14.

The web server 32 can also be internet connected to other software such as browsers 36, 38 and 40 located, for example, in another customer access terminal 42, a customer delivery terminal 44, or a personnel support terminal 46. The customer may view information about the items stored in the IDRS, for example, from terminal 42. This information may include date stored and type of item. The customer may also view any personalized information such as their e mail address and date of IDRS membership.

Delivery company personnel may view machine usage information such as is the IDRS full at certain locations and hardware failure information from a support terminal such as terminal 46 which is accessible by modem 45. The master server 20 is also shown connected to the delivery company-wide area network 15 which is coupled to the Internet 22 via a firewall 49 and connection 47.

Figure 3A:
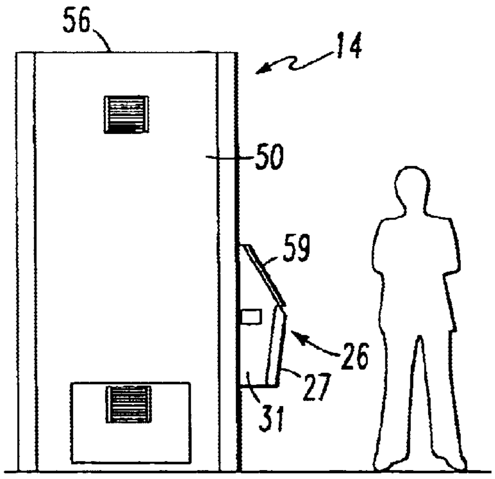
FIGS. 3A, and 3B are illustrative of left side and front elevational views of a single sided vertical carousel assembly forming a part of the IDRS so as to provide a secure enclosure in accordance with the preferred embodiment of the subject invention.
Figure 3B:
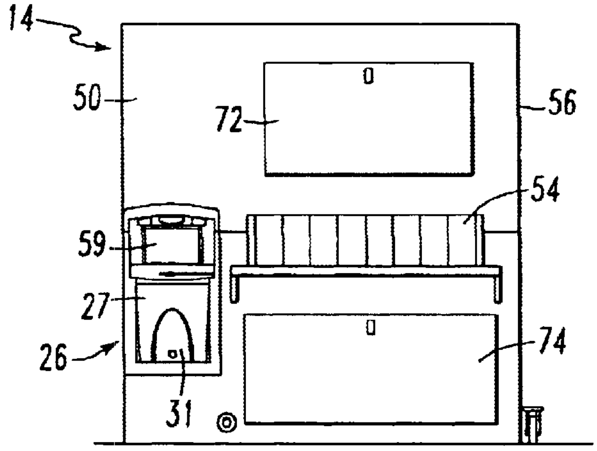
Figure 5:
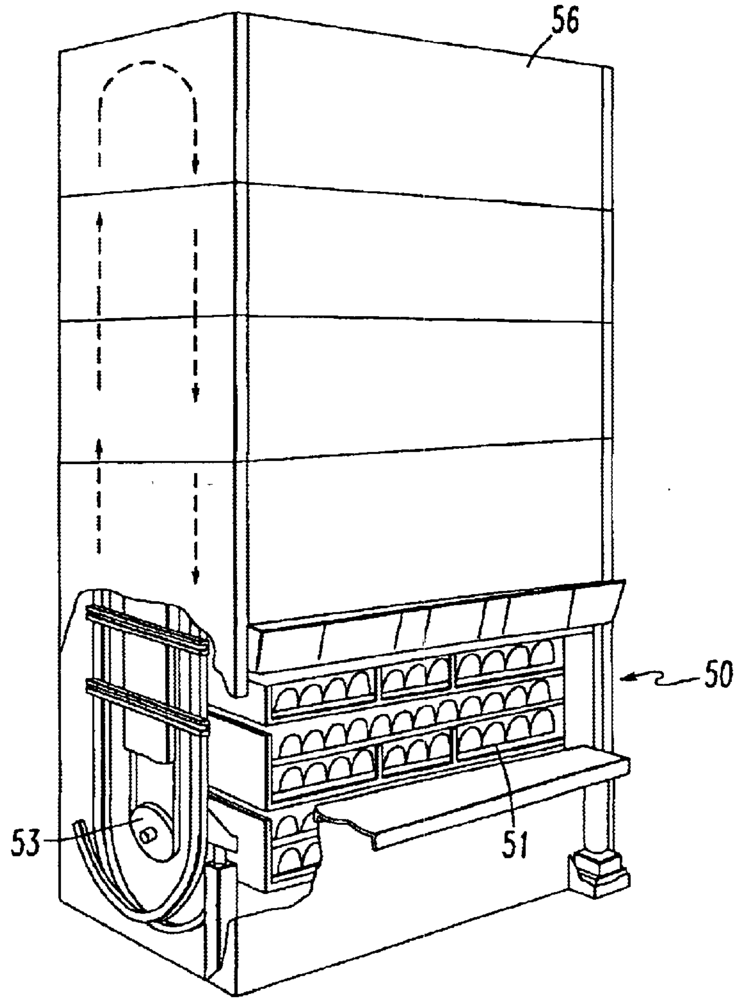
FIG. 5 is a partially cutaway respective view of the rear portion of the vertical carousel assembly shown in FIGS. 3A–3D.

The preferred embodiment of the storage subsystem 12 includes a vertical carousel 50, a single sided embodiment of which is shown in FIGS. 3A and 3B. The carousel 50 is constructed of individual carriers or shelves that travel on a chain and track as shown in FIG. 5. Vertical and horizontal mechanical inserts are mounted on the carriers with the insert determining the number of compartments associated with that carrier. The construction of the carriers and inserts preclude unauthorized access to adjacent compartments. The number and size of the compartments is furthermore configurable based on the delivery company requirements. The size of the compartment determines the size of the item which can be stored varying from postcard to large item. Each compartment is assigned a unique identifier identification number such as a sticker with a unique barcode for tracking items located therein. The computer subsystem keeps a database linking the storage compartment unique identifier with a unique mail piece identifier. A partially cutaway view of the single sided carousel structure is shown in FIG. 5 wherein a plurality of item holding trays 51 are moved up and down from front to back via a motor driven sprocket and chain assembly 53. This equipment is well known and comprises, for example, a vertical carousel manufactured and sold by Remstar International, Inc. of Westbrook, Me. Another known manufacturer is Hanel Storage Systems of Oakdale, Pa.

The carousel 50 also includes a set of sensors and a control system 52 (FIG. 1). The sensors allow the safe use of the storage subsystem by the general public. An optional safety light curtain is included across the customer access doors 54, as shown in FIG. 3B, to provide a means to stop the carousel or doors when obstructed by fingers, hands, arms or items. Internal sensors, not shown, detect items that obstruct the carousel's rotational flow. In the event of an obstruction, the motions of all access doors and the carousel cease. Optional emergency stops, also not shown, are located on the periphery of the machine to allow an immediate stop of the machine. Setting of an emergency stop by delivery company personnel (employees) results in ceasing the motion of all access doors and the carousel. Additional sensors may be included in the vertical carousel to detect carousel movement and interface to external pushbuttons.

The carousel control system interfaces with the sensors and controls the movement of the carousel 50. The carousel control system responds to requests from the computer subsystem in either the back office module 16 or front office module 14 via a software carousel driver shown in FIGS. 8 and 9 and which will be considered subsequently. The carousel control system includes a diagnostic capability so as to provide diagnostic information regarding the safety light curtain, photoeyes, motor starters and external pushbuttons.

As shown in FIGS. 3A, 3B and 5, the carousel 50 is housed within a secure enclosure 56. The enclosure 56 is vandal resistant and graffiti resistant. The front doors 54 of the carousel 50 are segmented to allow the opening of a door in front of the desired compartment only. The height, width, depth of the enclosure is based on customer requirements and mechanical constraints.

The front office client module 14 provides a user friendly customer interface implemented in customized application software for the retrieval of an item. The term "application" is well known in the art and refers to a computer program for carrying out a certain function or producing a certain result. As shown in FIG. 1, the front office module 14 includes in addition to application configurable browser software 30 which resides in the user access terminal 26, a screen 59 which may optionally be a touch screen and other optional devices such as a barcode reader 60, credit/debit card reader 62, pin pad 64, receipt printer 66, signature pad 68, and two security cameras 70 and 71. While the front office client module 14 is preferably accessed from the front, it may be accessed from the front and/or rear depending on the customer requirements.

Figure 4:
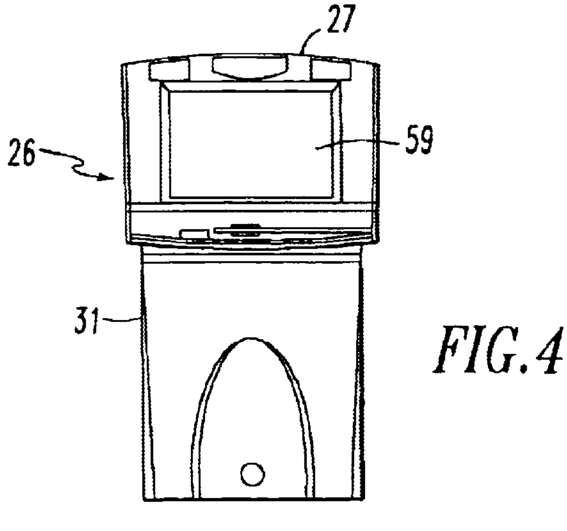
FIG. 4 is a partially cutaway perspective view of the rear portion of the vertical carousel assembly shown in FIGS. 3A–3D.

The front office user access terminal 26 is further shown in FIG. 4 consisting of a kiosk 27 having a touch activated screen 59 and a housing 31 wherein there is located the customized application software 58 for controlling the carousel 50.

The back office module 16 provides an interface also implemented in customized application software for employees to load the IDRS from front and/or rear access doors of the carousel 50. Two front access doors 72 and 74 are shown in the single sided carousel 50 shown in FIG. 3B. If the system does not require the carousel 50 to be rear loaded, the back office functions can be implemented on the customer interface side or front of the carousel 50 via the kiosk 27 as shown in FIG. 3B, but still may be accessed only by authorized delivery company personnel. In such a configuration, both software interfaces, i.e., a front office application program interface (FO API) and a back office application program interface (BO API) reside in the kiosk 27.

If the back office module 16 is located separate from the kiosk 27 such as where the carousel 50 is designed so as to be rear loaded from a back room, it would, for example, include a separate employee access terminal 24 equipped with its own application configuration browser software 28 as shown in FIG. 1. The terminal 24 would also include a screen 76 and other peripheral devices such as, but not limited to, a bar code reader 78, a modem 80 for connecting to a bank clearing switch 82 and apparatus 84 for connection to an external telephone 86. Additionally, such a back office module 16 would include a printer 88 which is coupled to the local area network 18.

Also shown in FIG. 1 is a handheld wireless device/scanner 90 which can access the storage subsystem 12, the front office module 14 and the back office module 16 including a screen 91 via a wireless local area network (LAN) shown by reference numerals 92 and 94 which are coupled to the local area network 18 and allows for mobility of the handheld device/scanner 94 The handheld wireless device/scanner 90 may also execute an application to store items in the carousel 50 of the IDRS system 10.

It should be noted that a single back office module 16 can control multiple front office modules 14 and storage subsystems 12 at high demand sites. This feature allows the delivery company to vary the quantity of front office kiosks 27 and carousels 50 based on site-to-site variations on demand.

The master server 20 shown in FIG. 1 includes state of the art digital computer apparatus supporting master server application software and is used to network the subject system 10 as well as multiple other systems together over the delivery company wide area network 15. The Master Server 20 allows delivery company supervisors and operations managers to browse any website(s) to determine usage rates across sites and system availability information. The master server 20 contains the centralized data for the IDRS system such as certain data indicating IDRS locations, user e-mail addresses, user account/loyalty card information, item status, and any other information needed to operate the system. Other master servers, not shown, may be linked to geographic regions for large or regional deployments. Customers may access the specific website to get item delivery traceability information. The firewall 49 prevents the public from corrupting the Master Server data and ensures data integrity.

Figure 6:
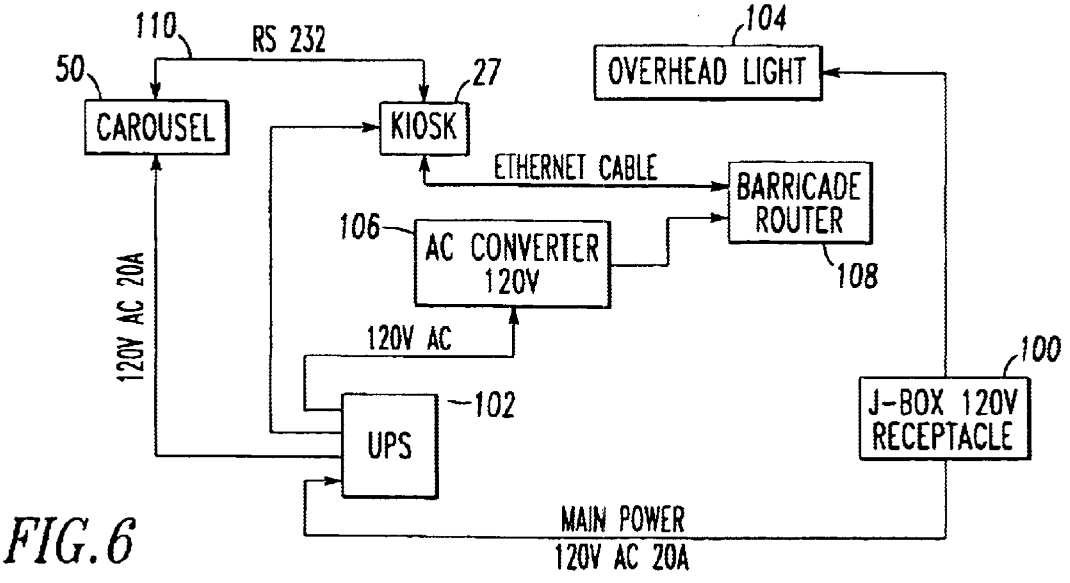
FIG. 6 is an electrical block diagram illustrative of the electrical system powering the apparatus in accordance with the subject invention.

Referring now briefly to FIG. 6, shown thereat is an electrical block diagram of the electrical power supplied to the equipment shown in FIGS. 3A, 3B, 4 and 5. 120 VAC electrical power is fed from an outside power line to a junction box/receptacle 100 where it then is fed to an AC power supply 102 and an overhead light 104. The power supply 102 feeds AC power on separate busses to the carousel 50, the kiosk 27 and a 120V AC converter 106 in a conventional manner. The output of the converter 106 is fed to a router 108 which provides an internet cable connection to the kiosk 40. An RS 232 communication cable 110 is shown connected between the carousel 50 and the kiosk 27.

Figure 7:
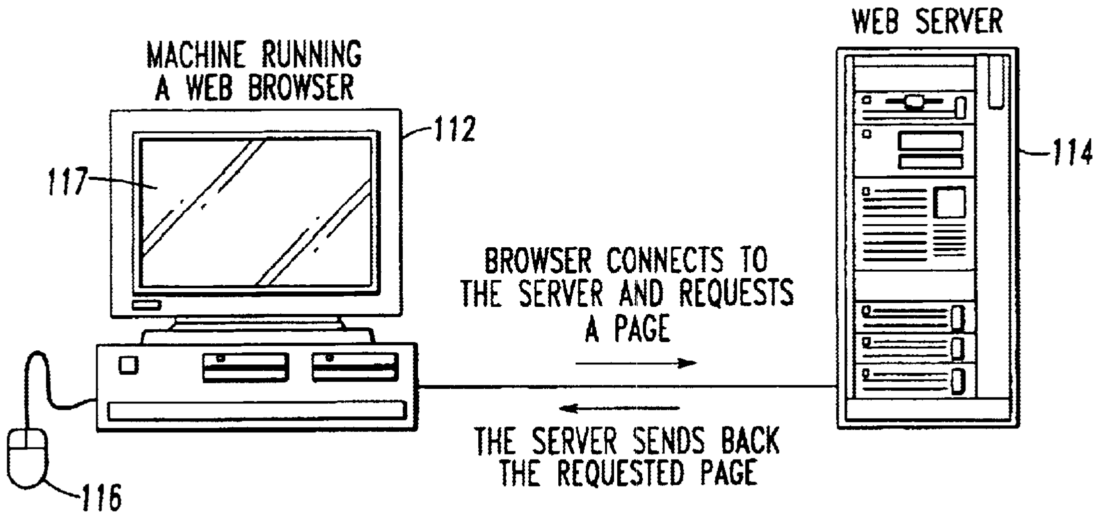
FIG. 7 is a block diagram illustrative of how web servers operate to request and receive a web page.

Before considering the details of the application software of this invention, reference is first made to FIG. 7 which is intended as a simple tutorial to illustrate how web browser technology is utilized to display a web page. As is well known, a web browser is a software application used to locate and display a web page, i.e., a document on the World Wide Web. As shown, reference numeral 112 denotes a machine running web browser software connected to a web server 114. Reference numeral 116 denotes a mouse, i.e., a well known hand activated device to move a cursor on a computer screen or activate a command, connected to the machine 112. Thus when a web page is desired, the browser software in the machine 112 connects to the server software in the web server 114 and requests a page. The web server 114 in turn retrieves the requested page from a digital storage located, for example, in a master server 18 shown in FIG. 1, where it is then sent back to the machine 312 running the web browser where it is then displayed on a screen 117.

Figure 8:
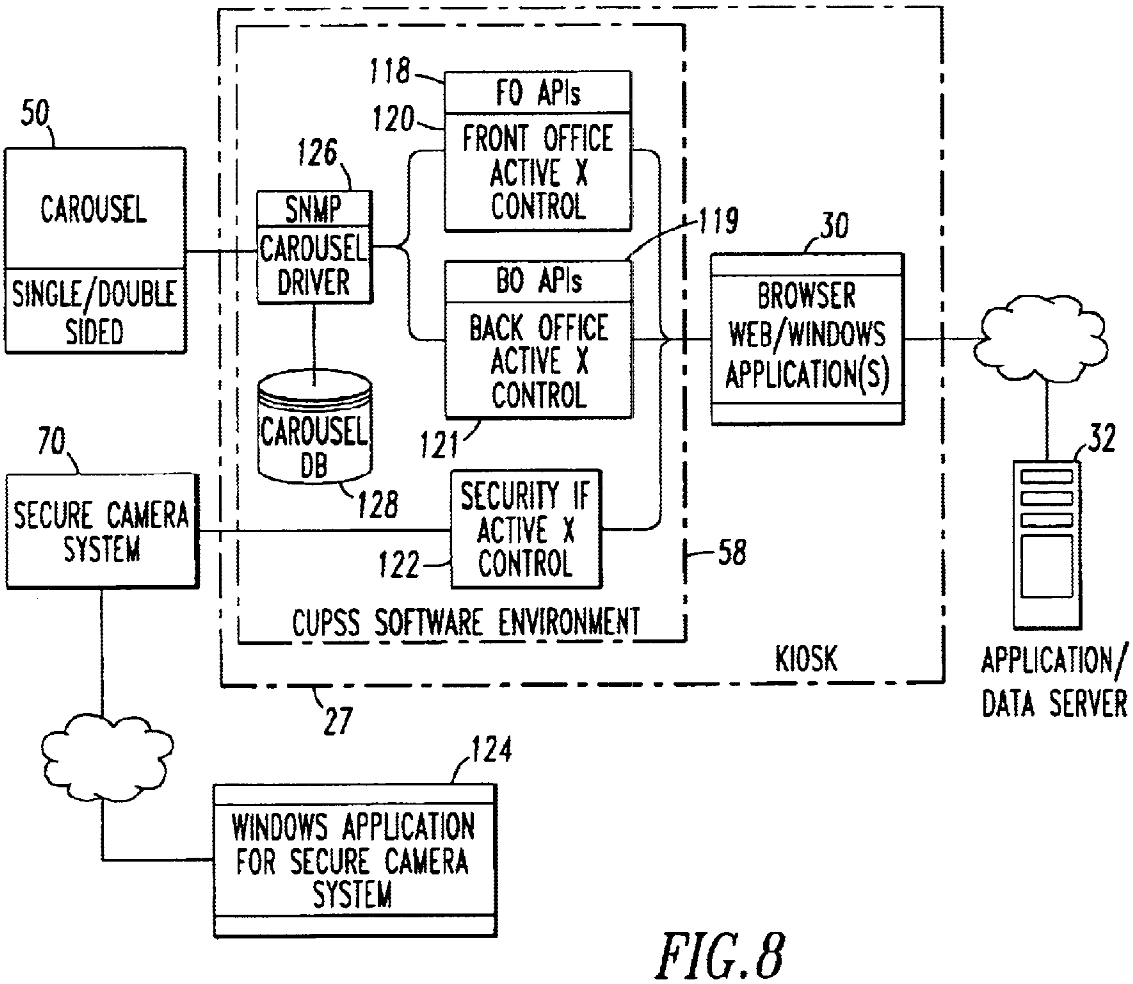
FIG. 8 is a block diagram further illustrative of the system architecture of the IDRS in accordance with the subject invention.

Referring now to FIG. 8, shown thereat is a simplified block diagram of the subject invention and illustrative of the software architecture in accordance with the preferred embodiment of the invention where the front office application program interface (FO API) 118 and the back office application program interface (BO API) 119, referred to above, are located in the CUPSS software environment 58 of the kiosk 27 (FIG. 4) using ActiveX control technology. As shown, the FO API 118 and BO API 119 support ActiveX controls 120 and 121. A security interface is also shown using ActiveX and control 122.

ActiveX control is a well known concept in current state of the art of digital computer technology. It is a programming language including a set of rules for how applications should share information and can be automatically downloaded and executed, for example, by a web browser. ActiveX controls have full access to a windows operating system using web pages. ActiveX control is particularly adapted to implement custom controls, which in the subject invention comprises the FO API 118, the BO API 119 and a carousel driver 126 which is connected to the carousel controller 38 (FIG. 1).

The FO API 118, the BO API 119, and the carousel driver 126 combine together to form a customized application and carousel independent interface which is configured on demand to meet a desired configuration of utilization. Accordingly, the carousel driver 126 can be instantaneously used to control any manufacturer's carousel simply by enabling the particular manufacture software switch and recompiling the driver associated therewith.

The configuration of the carousel 50, e.g. bin locations and size, is controlled by a carousel database 128 also residing in the CUPSS software environment 58. The carousel driver 126 supports both double sided and single sided configurations such as shown in FIGS. 2A and 2B. The carousel driver 126 coordinates access to the carousel 50 such that only one employee or customer operates the carousel at one time. For employee access, the carousel driver 126 opens front and/or rear doors, e.g. doors 72 and 74 shown in FIG. 3B, exposing multiple compartments authorized to be accessed by the employee. For customer access, the carousel driver 126 opens the front doors 54, exposing a single compartment authorized to be accessed by the customer.

Figure 9:
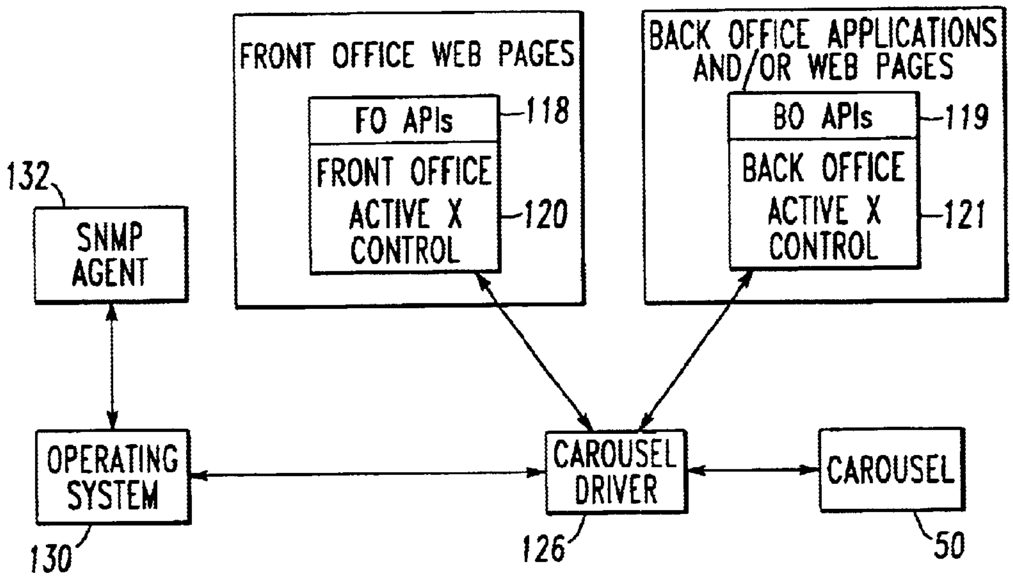
FIG. 9 is a block diagram illustrative of the basic carousel control architecture of the subject invention.

The carousel driver 126 also interacts with an operating system 130 and a simple network management protocol (SNMP) agent 132 as shown in FIG. 9 to ensure a safe environment is maintained during storage personnel/employee or customer/client operation. Status information from light curtains, door movement, carousel movement, and power fluctuations is constantly maintained. The carousel driver 126 uses the information to control the load and retrieval process so that the integrity of the carousel 50 is maintained, such as closing the doors during a power failure, and the safety of the user is maintained just closing the door while the user is reaching into a bin.

FIG. 9 is further illustrative of the control interface which controls the carousel 50 by way of the carousel driver 126 to rotate the carousel and to open and close doors and then completely manages any items that go into and out of the carousel. The ActiveX controls 120 and 121 are furthermore active only for the processing time of the applications or web pages that contain them. The major function of the ActiveX controls 120 and 121 in basic carousel control architecture shown in FIG. 9 can be summarized in the following table I.

TABLE I

| Front Office Control Functions | Back Office Control Functions |
|---|---|
| Connect | Connect |
| Cue Bin Location | Open All Doors |
| Open Bin Location | Open Bin Location |
| Close Bin | Rotate Carousel |
| | Identify Bin |
| | Close Bin |
| | Close All Doors |

The Connect function initializes connections of the ActiveX controls 120 and 121 to the carousel driver 126. The ActiveX control may also be required to pass an identification code to the carousel driver 126 for access control security. The Cue Bin Location function is used by the FO API 118 to rotate the carousel 50 such that the requested bin is positioned behind the doors 54 without any of the doors being opened. This function is used to reduce the service time required for the overall transactional session, if the operational rules of the application also include authentication of the user. The Cue Bin Location function will position the carousel 50 while the transactional process of authenticating the user takes place. This will reduce the overall transaction time. The Open Bin Location function is used by the BO API 119 and FO API 118 to position the carousel 50 and to open the doors to a specified bin. This may require an access code. The Open Doors function is a back office function that is used to gain full access to the carousel 50. This function may restrict access based on identification code. The Rotate Carousel function is used by the BO API 119 to position hidden carriers to the access point and may restrict access based on identification code. The Identify Bin function is used by the BO API 119 to identify a particular bin when all doors are open. This function may be used by applications to verify if bins are empty or indicate which items need attention. The Close Bin function is used by the FO API 118 and/or BO API 119 to close the doors. Once the door has been opened, the Close Bin function may also be used to clear bin access codes. The Close All Doors function is used by the BO API 119 to close all doors and secure the carousel 50.

Figure 10:
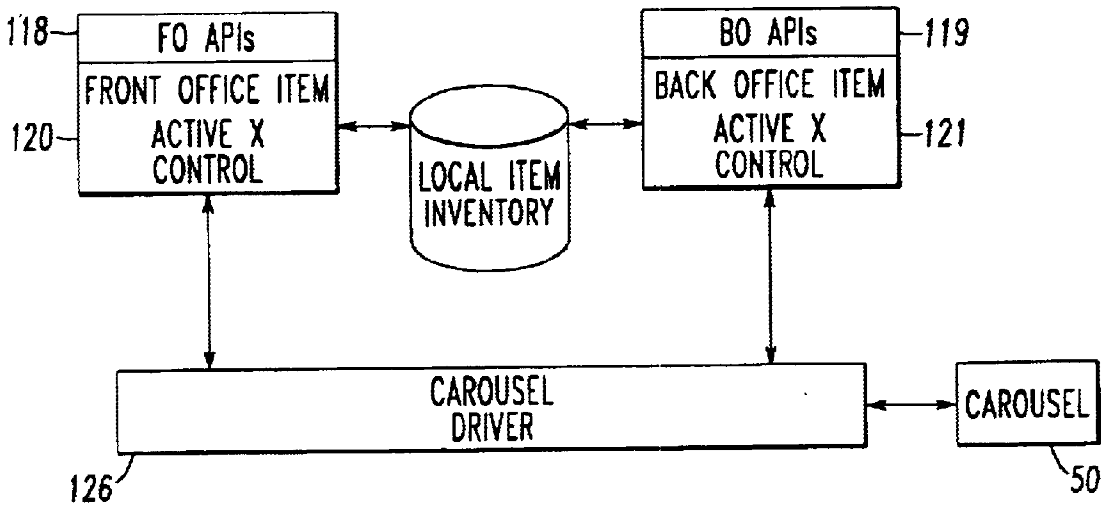
FIG. 10 is a block diagram illustrative of the enhanced item control architecture of the subject invention.

The present invention also contemplates an enhanced item controlled architecture shown in FIG. 10 which provides an interface to applications via ActiveX controls 120 and 121 for providing, among other things, inventory control of items that are placed into or out of the carousel 50. This enhanced architecture provides advanced functionality and allows multiple delivery companies to use a single IDRS carousel 50. This interface is more transactional based and permits an application to load items, find empty locations, remove items and a host of transactional type of information queries. Again, the carousel driver 126 is a persistent service of the operating system and the ActiveX controls are active only for the processing time of the applications or web pages that contain them. The enhanced architecture additionally includes a local item inventory database 134, but uses the same interfaces 120 and 121 to the carousel driver 126 for carousel control, but provides a higher level of service to the application through its APIs 118 and 119. Access codes that are required by the carousel driver 126 and are not provided by the application are generated by the ActiveX controls 120 and 121.

Application access for the enhanced item controlled architecture to the functions to be described can be classified in two types of control classes: (a) session access and, (b) bin access. Session access describes the protocol required to any given application to connect to the carousel driver 126. Bin access describes the protocol for a qualified application to reserve or lock any given bin.

Session access is controlled by means of an access control list (ACL) which is maintained in the data of the carousel driver 126. As is well known, a "list" is an ordered set of data which is normally accessed in a digital computer sequentially. The ACLs of the FO API 118 and BO API 119 will contain the ACL member ID of all authorized applications of the carousel 50. When an application initializes its embedded ActiveX controls 120 or 121, it in turn establishes the requisite transmission control protocol (TCP) connections to the carousel driver 126. The ACL member ID that is passed with the connection request will be checked against the carousel's ACL. A successful match will permit the connections to be made, assuming no other connection is established. An unsuccessful match will reject the connection and not permit that application to have access to the carousel 50. If there are no members in either ACLs, then it should be assumed that any application can access the carousel and no access security will be required to operate the carousel.

With respect to bin access, the carousel driver 126 will grant access to any given bin based on the access type declared for that bin at installation time. Each bin will be set up based on one of two access types Static or Dynamic.

The Static access type relates a given bin to a given application on the ACL. This type of bin access petitions the carousel 50 to either a single application or multiple applications with fixed storage capabilities. The Dynamic bin access type allows for more efficient use of the carousel 50 in the multiuse configuration by allowing applications to gain access to the bins based on a common pool of dynamically allocated bins. Once a bin has been accessed, the application may place or remove a lock on that bin with an application supplied access code. Subsequent access to that bin or removal of the lock will then require the access code for that bin. The carousel driver 126 will journal log all access activity via a simple network management protocol (SNMP). This information will provide the basis for "use accountability" for owners/administrators of the equipment.

It should be noted that if more than one member exists in the ACL of the BO API 121, back office operations will limit exposure of the bins, i.e., rotation operations, to only those bins which have any given application is authorized to use. This may be accomplished by closing all doors before a rotation and only granting open doors at authorized carrier level as will be described subsequently with respect to FIG. 12.

The Static bin access type is the simpler of the two access services. The configuration of the carousel 50 is segmented into a predetermined configuration which specifies who has the right to access any given bin. If no ACL member is specified, it would be assumed that any application has access to the bin. At configuration time, it should be noted that the segmentation definition will take into account for the dual sided and/or single sided system as shown, for example, in FIGS. 2A and 2B such that unauthorized bins will not be exposed during back office operations.

The Dynamic bin access has two modes of operation, with or without back office operations. Dynamic bin access without back office operations will permit any application to access any unlocked bin. Once the bin has been locked with an access code, both the ACL member ID and access code will be needed to re-access the bin or remove the lock. Dynamic bin access with back office operations, however, will operate as above, but with a further restriction such as to limit access to those bins where no other bin on that carrier, for single sided configurations and adjacent carrier for dual sided configurations, is locked by another ACL member ID.

The major function of these ActiveX controls for the enhanced architecture shown in FIG. 10 are summarized in the following Table II.

TABLE II

| Front Office Item Functions | Back Office Item Functions |
|---|---|
| Connect | Connect |
| Cue Item/Authenticate User | Register Item |
| Load Item | Purge Item |
| Remove Item | Load Item |
| Close Bin | Remove Item |
| Return Item | Open All Doors |
| Query Item | Open Bin Location |
| Print Receipt | Identify Bin |
| | Rotate Carousel |
| | Close Bin |
| | Close All Doors |
| | Database Maintenance/Reports |

With respect to the functions listed in Table II, the Connect function, for example, initializes connections of the ActiveX control of FO API 118 and BO API 119 to the carousel driver 126. The ActiveX controls may also be required to pass an identification code to the carousel driver 126 for access control security. This function is the same as in the basic control outlined in Table I. The Cue Item function is similar to the Cue Bin Location function of Table I and is used by the FO API 118 to rotate the carousel 50 such that the requested item is positioned behind the doors 54 without any of the doors being opened. This function is also used to reduce the service time required for the overall transactional session. If the operational rules of the application include authentication of the user, the Cue Item function will position the carousel 50 while the transactional process of authenticating the user can take place, and thus will also reduce overall transaction time. The Register Item function is used by the BO API 119 to register an item and the item characteristics in the inventory data base 134 (FIG. 10). This function may be used to set the bin access code and may use an external scanner or similar data entry device. The Load Item function is similar to the Open Bin Location function (Table I) and is the function used by both the BO API 119 and the FO API 118 to position the carousel 50 and open the doors, for example, 72 and/or 74 of FIG. 3B for a specified item at a specific location. The item is then registered in the local database 134. This function may also be used to set the bin access code and may use an external scanner or similar data entry device.

The Purge Item function is used by the BO API 119 to remove an item in the local data base 134 and clear the bin access code. This function may require a bin-access code and also may use an external scanner or similar data entry device. The Close Bin function is used by FO API 118 and/or BO API 119 to close the doors 54, 72, 74. The Remove Item function is similar to the Open Bin Location function of Table I and is the function used by both the BO API 119 and the FO API 118 to position the carousel 50 and open the doors 54 to a specified item. The item is then marked as removed from the local database 134 and the bin access code is cleared if a bin access code is present.

The Return Item function is used by the FO API 118 to close the bin doors 54 and flag/mark the item in the database

134 for return. This function may also be used to flag an item that has not been removed from the carousel 50 but has been purged from the database 134. This function may be used to set the bin access code and is similar to the Remove Item and the Load Item function, noted above, with an item that is already in the system. The Query Item function is used by the FO API 118 to find and load time and status information into the database 134 regarding item removal or return. The Print Receipt function is used by the FO API 118 to print a transaction receipt of item removal or return from the carousel 50.

The Open All Doors function is a function of the BO API 119 that is used to gain full access to the carousel 50. The Open All Doors function may restrict access based on an identification code and is the same as in the basic control outlined in Table I. The Open Bin Location function is used by the BO API 119 to position the carousel 50 and to open the doors 72 or 74 to a specified bin and may require an access code. Again, this function is the same as in the basic control outlined above with respect to Table I. The Identify Bin function is used by the BO API 119 to identify a particular bin when all doors are opened. This function may be used by applications to verify if bins are empty or indicate which items need attention. This function is also the same as in the basic control outlined above.

The Rotate Carousel function is used by the BO API 119 to position hidden carriers to a specific access point and may restrict access based on an identification code. This function is also the same as in the basic control. The Close All Doors function is used by the BO API 119 to close all doors and secure the machine and is the same as in the basic control described with respect to FIG. 9. Finally, the Database Maintenance/Reports function is used by the BO API 119 to update the database 134.

Other queries and maintenance functions of the local item inventory base will depend on the design of the database itself.

Figure 11:
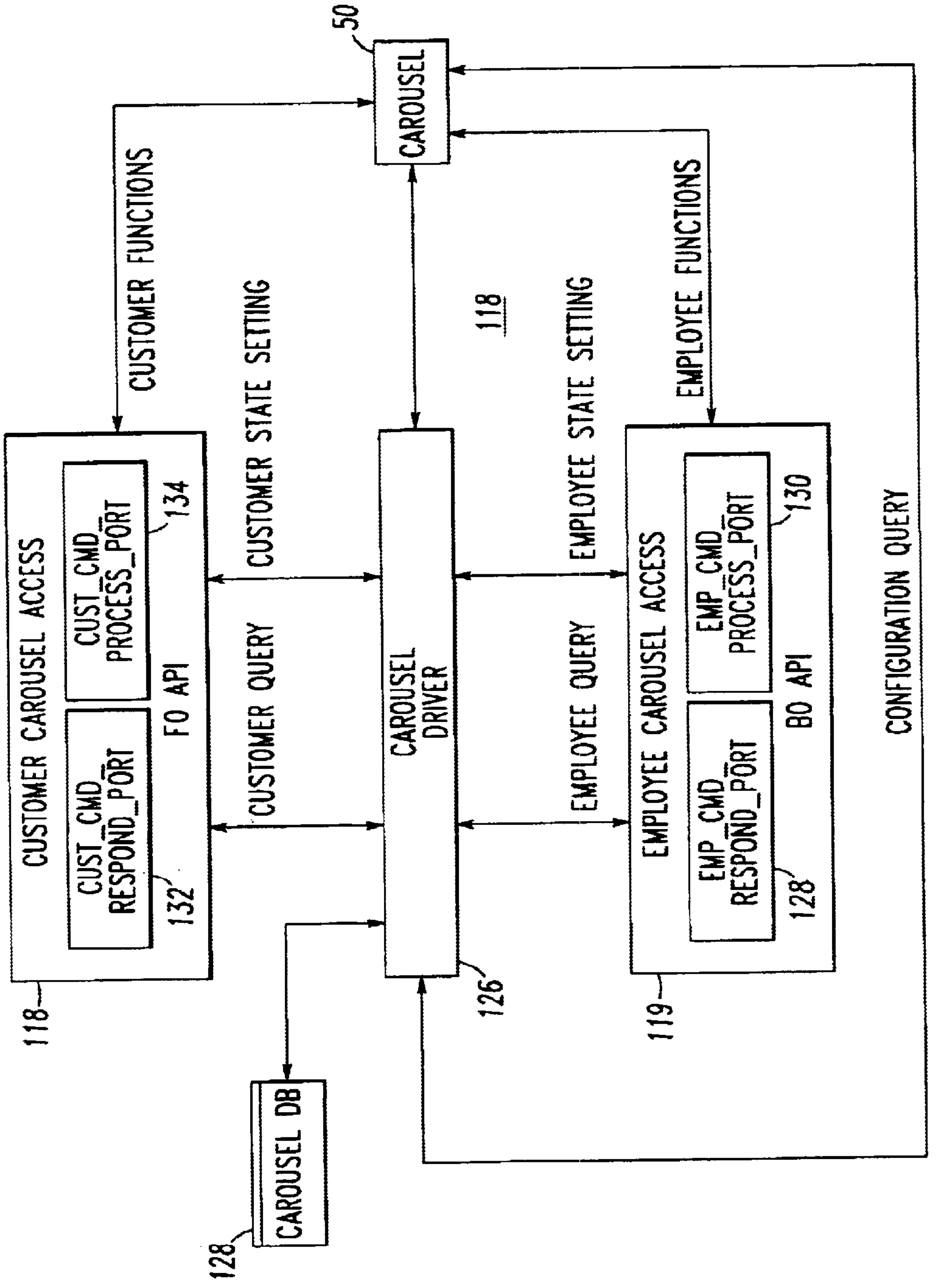
FIG. 11 is a block diagram further illustrative of the carousel driver interface of the subject invention.

With respect to the three major interfaces considered above with respect to FIGS. 8, 9 and 10, namely: the employee or BO API 119; the customer or FO API 118, and the carousel driver interface 136, the employee or BO API 119 has access to the carousel driver 126 as shown, for example, in FIG. 11 through an immediate response port termed a "command respond port" 128 or a process generate event port termed a "command process port" 130. The command respond port 128 will return with the function result. The command process port 130 will return the success of sending the message upon receiving the completion or error of a command. This port will generate an event with the status of the last command. The attached Appendix A is illustrative of the set of functions implemented by the employee interface or BO API 119.

The customer or FO API interface 118 has access to the carousel driver 126 through an immediate response port termed a "command respond port" shown by reference numeral 132 or a process and generate event port termed a "command process port" 134 shown in FIG. 11. The command respond port 132 will return with the function result. The command process port 134 will return the success of sending the message and upon receiving the completion or error of a command, this port will generate an event with the status of the last command. The attached Appendix B is illustrative of the set of functions implemented by the customer interface or FO API 118.

As noted above, the carousel driver interface 136 is an executable program that communicates directly with the carousel 50, with both the customer FO API 118 and employee BO API 119. ActiveX controls 120 and 121 communicate with the carousel through this driver. The attached Appendix C is illustrative of the set of functions implemented by the carousel driver interface 126.

It should be noted that ActiveX controls can be used, without modification, by any development environment such as the Web. The application programming interface (API) remains constant, irrespective of whether a web page of a windows application is operating the carousel 50. This significantly reduces the software effort because the same API is used in both the Web and programming development environments. In addition, by hiding the peripheral details, this common use interface provides higher level interfaces to the developers, resulting in shorter time-to-market efforts.

Figure 12:
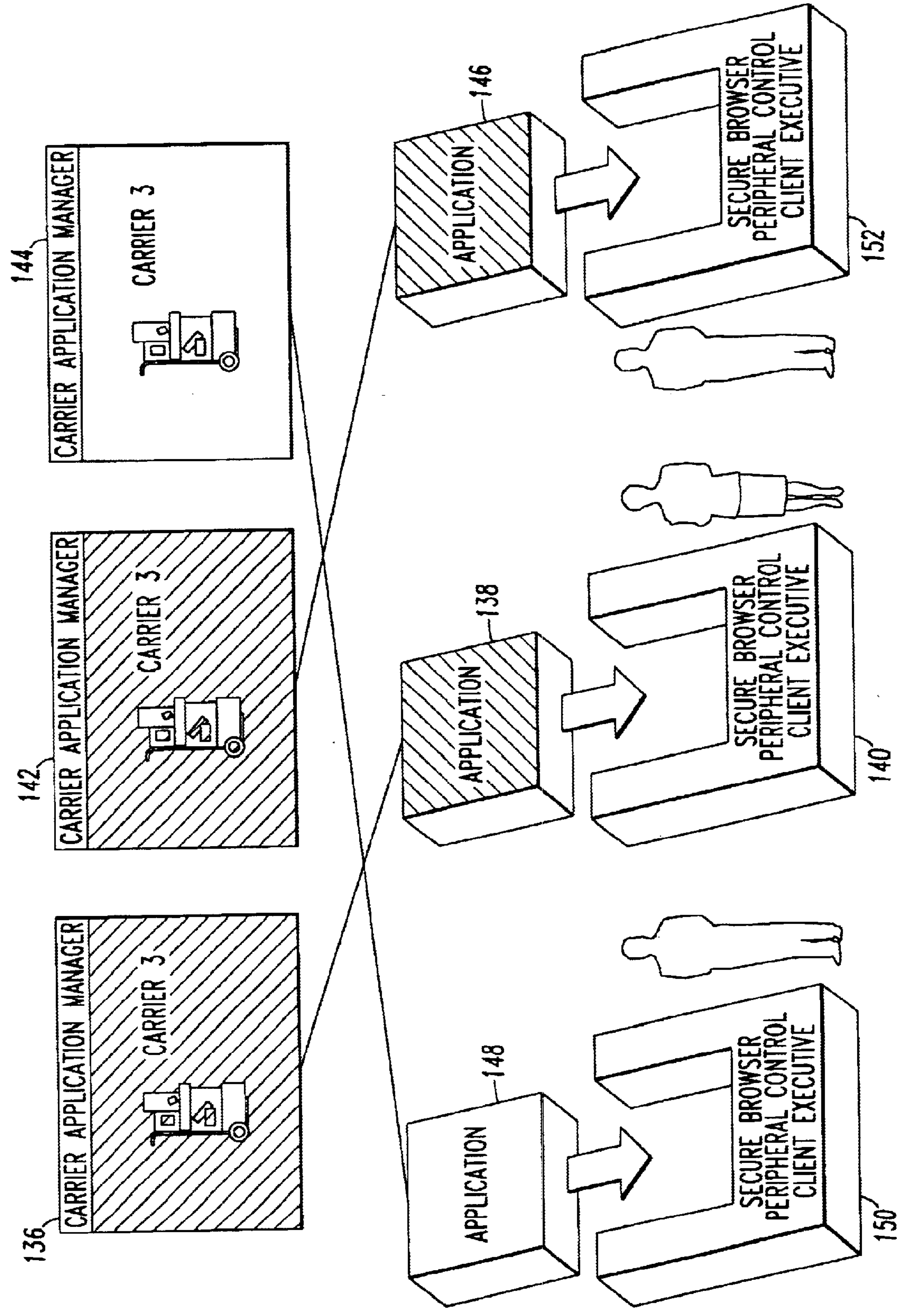
FIG. 12 is a block diagram illustrative of an application of the item delivery and retrieval system in accordance with the subject invention.

For example, FIG. 12 is illustrative of a multiple user scenario. In FIG. 12, carriers refer to delivery companies. Accordingly, when a user approaches the IDRS system 10, he/she enters which item(s) they wish to retrieve, for example, using the kiosk 27. If delivery company 1 shown by reference numeral 136 delivered the item(s) to be retrieved, then delivery company 1's application 138 is plugged into the browser peripheral control portion 140 of the FO API 118 and executed by the Front Office ActiveX control 120 shown, for example, in FIGS. 8–10. At this time, delivery company 1 has control of the carousel 50 and can only access the designated items. The carousel driver 126 prevents any access to any other delivery companies, items or information. After the user has completed the transaction, all information with respect to the user, the delivery company and transaction is flushed from the carousel database 128. Thus a virtual architecture is generated which allows each delivery company, for example, delivery companies 2 and 3 designated by reference numerals 138 and 140 to function with confidence so that no other delivery company can view or gather any of its private information. As shown in FIG. 12, the delivery companies 2 and 3 can insert their respective applications 146 and 148 to respective browser peripheral control portions 150 and 152, which would then be executed in turn.

Considering now FIGS. 13–16, shown thereat are four step sequences outlining four possible modes of operation. Typically, a user, e.g., an employee of a delivery service company operates the IDRS in accordance with the subject invention from behind a customer service counter. A second user, e.g., a customer of the delivery service company interfaces with the IDRS system 10 using the front office client module 14 and retrieves the items from the storage subsystem module 12. Four scenarios are provided for customers to retrieve undelivered items, namely: (1) barcoded notification form; (2) internet e-mail notification; (3) customer loyalty card (similar to supermarket savings cards and library cards with a magnetic strip on the back); and (4) front counter clerk.

The notification form approach (1) requires the delivery company courier to leave a written notice at the residence or business of attempted delivery. The written notice has a barcode on the form matching a self-stick barcode label placed on the item. When the delivery of an item cannot be completed, the courier will fill out a notification form, peel off a self-stick barcode label, and apply it to the item. The form is left at the address and the item is brought back to the IDRS 10. Once back at the delivery facility, the employee uses the back office subsystem module to initiate loading the storage unit 12 including the carousel 50. The screen on the terminal 28 in the back office subsystem module 16 displays the available compartments in the carousel 50. The employee then selects an empty compartment to match the item size. The application software in the back office subsystem module 16 automatically requests the carousel 50 to move the compartment to the loading position and the doors of the carousel are opened. The employee scans the self-stick barcode label and an IDRS storage location barcode label is scanned and fed into a database.

Figure 13:
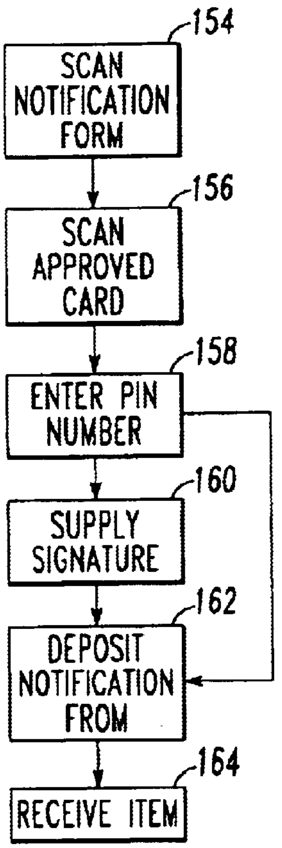
FIGS. 13, 14, 15 and 16 are simplified flow charts illustrative of four modes of utility of the subject invention.

Thereafter, a customer retrieves the items via the notification form. As shown in FIG. 13, at step 154, the customer scans the barcode on the notification form into the system at the kiosk 27 using the barcode reader 60 (FIG. 1). The IDRS ActiveX software described above uses the scanned barcode to reference the proper storage location linked to the form's barcode. Thereafter, an approved card provided by the delivery company for delivery authentication is scanned at step 156. If the delivery company requires, the customer uses a credit card, debit or customer loyalty card to authenticate the identity of the customer. Payment may be accepted for the transaction if the delivery company requests payment. A PIN number associated with the card is entered per step 158. This information is remotely verified and authenticates the user so that the card holder information tracks the person who picked up the item. The customer will then be prompted to supply a signature in accordance with step 160 via the signature pad 68 or on a touch screen 59 of the kiosk 27. This signature also tracks the person who signed for the item. Thereafter, the doors 54 of the carousel 50 automatically opens to the storage location of the customer's item. The customer then is prompted to deposit the notification form per step 169 into a slot and the previously undelivered item is retrieved per step 164. During this process, photos of the person retrieving the item may also be required using the cameras 64 shown in FIG. 1.

The second scenario involves internet e-mail notification (2). This approach requires notifying the customer via a supplied e-mail address, contained in a database of the master server 20 whenever an item is stored in the IDRS. In such an operational mode, the customer is first registered for service via the Internet by accessing a website and requesting internet e-mail notification service. At a minimum, a delivery address is provided to re-direct to the IDRS system. An e-mail address is provided to receive the notification. After registering, the customer must activate the service by calling the IDRS from a phone at the address given during registration. A customer selects a delivery profile, e.g., automatic placement of the item in the IDRS system 10. The customer indicates a preference to automatically put deliveries into the carousel 50 and thereafter eliminate any further attempts to deliver to the customer's address.

When an item is then stored in the carousel 50, an e-mail is sent to the e-mail address on file. The e-mail contains instructions on how to retrieve the item, including a six-digit PIN along with the location of the IDRS system, i.e., the address at which the IDRS 10 is located and, when desirable, with an optional map showing street locations, etc.

Items for the customer will be directed immediately to the IDRS 10 if the customer selected this delivery profile for this account. Not delivering the item reduces courier delivery time, delivery vehicle wear, and delivery vehicle gas and maintenance. The item may contain other delivery company barcodes such as expedite shipment confirmation of delivery, insured item, and indication of any other special handling. Any of these additional barcodes will also be scanned into the IDRS when the item is stored in the carousel. An e-mail is thereafter sent to the e-mail address on file associated with the item's delivery address.

Figure 14:
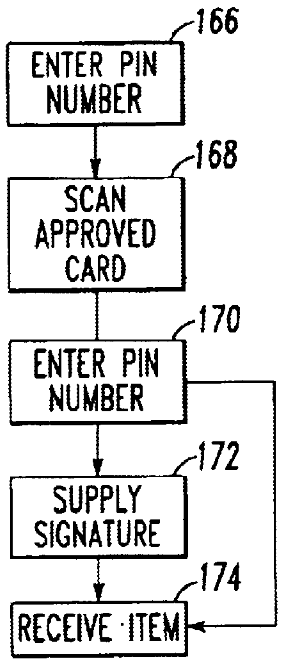

As shown in FIG. 14, a customer would then go to the IDRS 10 and enter the 6-digit e-mail PIN on the PIN pad 64 as indicated by step 166. Next, a photo of the customer is taken via the cameras 70 shown in FIG. 1, whereupon the IDRS system 10 uses the e-mail PIN to reference the storage location(s) linked to the PIN. Next, the customer uses a card approved by the delivery company for delivery authentication. If the delivery company requires, the customer uses a credit card, debit or customer loyalty card to authenticate the identity of the user. Payment may be accepted for the transaction, if the delivery company requires payment. Next, the card is scanned via the card reader 62 in accordance with step 168 and the customer enters the PIN associated with the card. This is indicated by step 170. The information on the card is remotely verified and authenticates the user. If the delivery company requires, the IDRS 10 system will prompt the customer to supply a signature per step 172 via the electronic signature pad 68 or on the touch screen 59 (FIG. 5). Thereafter, the IDRS opens automatically to the store location of the stored item. The item is then removed from the storage location per step 174 and if the delivery company requires, a second photo of the item removal process is made.

Figure 15:
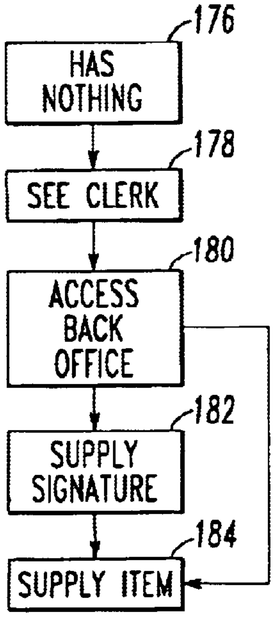

The third scenario (3) is shown in FIG. 15 and one where a front counter clerk provides the necessary access information when a customer has lost or forgotten, for example, the notification form, e-mail/PIN or customer loyalty card/PIN or simply needs assistance at the IDRS 10 following storage of an item in the carousel 50 and where the customer had previously been alerted either by notification form or e-mail.

In such an instance, where the customer needs assistance as indicated by step 176, he/she would proceed to the front counter and see the clerk/employee per step 178 who would obtain the necessary information such as the delivery address and name and the necessary customer identification. The clerk then enters the address into the IDRS in the back office module 16 in accordance with step 180, whereupon the IDRS 10 uses the address to reference the storage location(s) linked to the address. The clerk/employee then retrieves the item(s) and upon receiving a customer signature per step 182, the item is supplied in accordance with step 184.

The fourth scenario (4) permits the customer to use a delivery company issued customer loyalty card to retrieve items stored in the IDRS. In this mode of operation, the customer would again register for service via the web by accessing a website and requesting customer loyalty service. This would again involve providing a delivery address to re-direct to the IDRS and an e-mail address to receive the notification. After registration, the delivery company mails a customer loyalty card to the customer.

Thereafter, the customer must activate the service by calling the IDRS from a phone at the address given during registration. The customer would then select a delivery profile, whereupon an e-mail notification is sent by the IDRS to the e-mail address on file. Contained in the e-mail are instructions on how to retrieve the item; however, there is no 6-digit PIN. Contained on the customer loyalty card is an encoded loyalty PIN number. The customer must then supply an associated PIN for authentication when using the customer loyalty card to access the IDRS.

Items will be directed immediately to the IDRS if a customer selected such a delivery profile for their account. The item may contain other delivery company barcodes such as expedited shipment confirmation of delivery, insured item indication of any other special handling required. Any of these additional barcodes will be scanned into the IDRS when the item stored upon non-delivery. An e-mail is sent to the e-mail address on file associated with the item delivery address.

Figure 16:
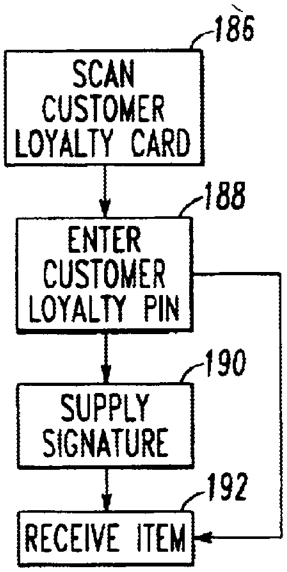

When the customer arrives at the IDRS, he/she enters the customer loyalty card and PIN via the card reader in the PIN pad as shown by steps 186 and 188 in FIG. 16. The cameras 64 would also take a photo of the customer. The IDRS system uses the customer loyalty account number to reference the storage location(s) of all items linked to the account. Authentication when necessary via signature is provided by the supply of a signature which would be prompted by the system per step 190. The doors 54 of the carousel 50 open automatically to the storage location of the item which is retrieved per step 192. Again, if the delivery company requires, a second photo of the item removal process is taken via the cameras 64 shown in FIG. 1.

It should be noted that the flexibility of the IDRS system 10 in accordance with the subject invention allows the delivery company to deploy the appropriate configuration depending upon available floor space, item mix and capacity.

Having thus shown and described what is at present considered to be the preferred embodiment of the invention, it should be noted that the foregoing detailed description merely illustrates principles of the invention. It will thus be appreciated that those skilled in the art will be able to devise various arrangements which although not explicitly described or shown herein, embody the principles of the invention and are thus within its spirit and scope.

APPENDIX A 1215-0422P
1/3 BD-01-029

Employee Interface API

Overview

The Employee Interface is the set of functions used by a NG application to provide a carousel service to an employee. The Employee Interface has access to the Carousel Driver through an immediate response port (command respond port) or a process and generate event port (command process port). The command respo will return with the function result. The command process port will return the success of sending the messag upon receiving the completion or error of a command, this port will generate an event with the status of the las command.

Events will be returned as one of the format: MsgEvent(INT msgVal, STRING tag)
Current values are as follows:
- -2 - Socket Error (use GetErrDesc() for description)
- -1 - Socket Error (not connected to Carousel Driver)
- 0 - OK: Operation complete
- 1 - ERR: error encountered while executing command (use GetErrDesc() for description)
- 2 - TIMEOUT: Result not received by the Driver within time period
- 3 - INUSE: Driver in use by the customer
- 4 - BUSY: Carousel Driver is busy processing another command
- 5 - HWERR: Hardware error that reports carousel errors Registry values (in HKEY_CLASSES_ROOT\CUPSS):

| | |
|---|---|
| CMD_PROCESS_TIMEOUT | - Time period to wait for result from driver before returning "timed out" error.<br>- If "0", then timeout is not used. |
| CMD_RESPOND_TIMEOUT | - Time period to wait for result from driver before returning "timed out" error.<br>- If "0", then timeout is not used. |
| DRIVER_HOST_NAME | - Host name where driver is running (i.e. "127. 0. 0. 0" or "localhost") |
| EMP_CMD_PROCESS_PORT | - Port number of the command process port (i.e. 5008) |
| EMP_CMD_RESPOND_PORT | - Port number of the command respond port (i.e. 5010) |

*Carousel Functions:*

SHORT CloseDoors()
The carousel will close the doors that are currently open.

Return Format:
0 - Successfully sent information to Carousel Driver
-1 - Socket error (call GetErrDesc() to get description of error)

STRING GetBinInfo(STRING binID)
Returns the carrier number, height, width, depth, and unit number of the specified location (binID).

Parameter Format:
BinID = U000000B00000

Return Format:
Unit:xx, Carrier:yy, Shelf:ss, H:hh, W:ww, D:dd
Where xx = Unit Number
yy = Carrier Number
ss = Shelf Number
hh = height (inches)
ww = width (inches)
dd = depth (inches)

STRING GetCtrlVersion()
Returns the current version of the ActiveX control.

Return Format:
x.x (i.e. "0.9")

STRING GetDrvVersion()
Returns the current version of the carousel driver.

Return Format:
x.x (i.e. "0.9")

APPENDIX A

2/3

STRING GetErrDesc()

Returns an error description of the last function.

Return Format:

Error description (i.e. "Carousel Busy", "In Use by Customer")

SHORT GetMaxBins (STRING carrier, STRING shelf)

If "carrier" and "shelf" are empty, then this method returns the maximum number of bins in current carousel configuration. Otherwise, the number of bins for the specified carrier and shelf are returned.

Return Format:

Max bins in carousel {i.e. 114}
OR
Max bins per carrier and shelf {i.e. 7}

SHORT GetMaxCarriers ()

Returns the maximum number of carriers in current carousel configuration.

Return Format:

Max carriers {i.e. 12}

SHORT GetMaxShevles (STRING carrier)

If "carrier" is empty, then this method returns the maximum number of shelves in current carousel configuration. Otherwise, the number of shelves on the specified carrier is returned.

Return Format:

Max shelves {i.e. 36}
OR
Max shelves per carrier {i.e. 3}

STRING GetState()

Returns the current state of the customer access to the carousel.

Return Format:

{busy, error, idle, inuse, ready}

SHORT Initialize()

Initialize the socket connections using registry values EMP_CMD_PROCESS_PORT, EMP_CMD_RESPOND_PORT and DRIVER_HOST_NAME.

Return Format:

Bit map of errors
1 - process port invalid
2 - respond port invalid
3 - no host name for driver SHORT OpenAllDoors()

The carousel will open all doors for employee access.

Return Format:

0 - Successfully sent information to Carousel Driver
-1 - Socket error (call GetErrDesc() to get description of error)

APPENDIX A

3/3

SHORT RetrieveBin(STRING binID, STRING time)

Given a location (binID), the carousel will rotate the carriers, if necessary, and open the bin doors for retrieval. The doors will close in "time" seconds.

Parameter Format:

binID = U000000B00000 time = {0 ... 65} seconds, 0 = forever, default = 30 seconds

Return Format:

0 - Successfully sent information to Carousel Driver

-1 - Socket error (call GetErrDesc() to get description of error)

SHORT Rotate (STRING carrier, STRING shelf)

The carousel will rotate to the specified location determined by carrier and shelf.

Parameter Format:

Position = {1 ... Max shelves}

Return Format:

0 - Successfully sent information to Carousel Driver

-1 - Socket error (call GetErrDesc() to get description of error)

SHORT RotateDown()

The carousel will rotate down one carrier.

Return Format:

0 - Successfully sent information to Carousel Driver

-1 - Socket error (call GetErrDesc() to get description of error)

SHORT RotateUp()

The carousel will rotate up one carrier.

Return Format:

0 - Successfully sent information to Carousel Driver

-1 - Socket error (call GetErrDesc() to get description of error)

APPENDIX B 1215-0422P
BD-01-029

1/3

Customer Interface API

Overview

The Customer Interface is the set of functions used by a NG application to provide a carousel service to a customer. The Customer Interface has access to the Carousel Driver through an immediate response port (command respond port) or a process and generate event port (command process port). The command respond port will return with the function result. The command process port will return the success of sending the message and upon receiving the completion or error of a command, this port will generate an event with the status of the last command.

Events will be returned as one of the format: MsgEvent(INT msgVal, STRING tag)
Current values are as follows:

- -2 - Socket Error (use GetErrDesc() for description)
- -1 - Socket Error (not connected to Carousel Driver)
- 0 - OK: Operation complete
- 1 - HWERR: Hardware error that reports carousel errors
- 2 - ERR: error encountered while executing command (use GetErrDesc() for description)
- 3 - TIMEOUT: Result not received by the Driver within time period
- 4 - INUSE: Driver in use by the employee
- 5 - BUSY: Carousel Driver is busy processing another command Registry values (in HKEY_CLASSES_ROOT\CUPSS):

| | |
|---|---|
| CMD_PROCESS_TIMEOUT | - Time period to wait for result from driver before returning "timed out" error.<br>- If "0", then timeout is not used. |
| CMD_RESPOND_TIMEOUT | - Time period to wait for result from driver before returning "timed out" error.<br>- If "0", then timeout is not used. |
| CUST_CMD_PROCESS_PORT | - Port number of the command process port (i.e. 5007) |
| CUST_CMD_RESPOND_PORT | - Port number of the command respond port (i.e. 5009) |
| CUST_TAKE_CONTROL | - If "1", then customer will take control of carousel from employee. |
| DRIVER_HOST_NAME | - Host name where driver is running (i.e. "127. 0. 0. 0" or "localhost") |

*Carousel Functions:*

SHORT CloseDoors()

The carousel will close the doors that are currently open.

Return Format:
0 - Successfully sent information to Carousel Driver
-1 - Socket error (call GetErrDesc() to get description of error)

STRING GetBinInfo(STRING binID)

Returns the carrier number, height, width, depth, and unit number of the specified location (binID).

Parameter Format:
BinID = U000000B00000

Return Format:
Unit:xx, Carrier:yy, Shelf:ss, H:hh, W:ww, D:dd
Where xx = Unit Number
yy = Carrier Number
ss = Shelf Number
hh = height (inches)
ww = width (inches)
dd = depth (inches)

STRING GetCtrlVersion()

Returns the current version of the ActiveX control.

Return Format:
x.x (i.e. "0.9")

APPENDIX B

2/3

STRING GetDrvVersion()

Returns the current version of the carousel driver.

Return Format:

x.x (i.e. "0.9")

STRING GetErrDesc()

Returns an error description of the last function.

Return Format:

Error description (i.e. "Carousel Busy", "In Use by Customer")

SHORT GetMaxBins (STRING carrier, STRING shelf)

If "carrier" and "shelf" are empty, then this method returns the maximum number of bins in current carousel configuration. Otherwise, the number of bins for the specified carrier and shelf are returned.

Return Format:

Max bins in carousel {i.e. 114}
OR
Max bins per carrier and shelf {i.e. 7}

SHORT GetMaxCarriers ()

Returns the maximum number of carriers in current carousel configuration.

Return Format:

Max carriers {i.e. 12}

SHORT GetMaxShevles (STRING carrier)

If "carrier" is empty, then this method returns the maximum number of shelves in current carousel configuration. Otherwise, the number of shelves on the specified carrier is returned.

Return Format:

Max shelves {i.e. 36}
OR
Max shelves per carrier {i.e. 3}

STRING GetState()

Returns the current state of the customer access to the carousel.

Return Format:

{busy, error, idle, inuse, ready}

SHORT Initialize()

Initialize the socket connections using registry values EMP_CMD_PROCESS_PORT, EMP_CMD_RESPOND_PORT and DRIVER_HOST_NAME.

Return Format:

Bit map of errors
1 - process port invalid
2 - respond port invalid
3 - no host name for driver

APPENDIX B

3/3

SHORT QueueBin(STRING BinID)

The carousel will rotate the carriers to put the location (BinID) in a retrieval position.

Parameter Format:

BinID = U000000B00000

Return Format:

0 - Successfully sent information to Carousel Driver

-1 - Socket error (call GetErrDesc() to get description of error)

STRING RequestService()

Request that employee functions to be terminated and customer be given control of the carousel if registry value CUST_TAKE_CONTROL is set to "1". Currently not implemented.

Return Format:

0 - Successfully sent information to Carousel Driver

-1 - Socket error (call GetErrDesc() to get description of error)

SHORT RetrieveBin(STRING binID, STRING time)

Given a location (binID), the carousel will rotate the carriers, if necessary, and open the bin doors for retrieval. The doors will close in "time" seconds.

Parameter Format:

binID = U000000B00000 time = {1 ... 65} seconds, default = 30 seconds

Return Format:

0 - Successfully sent information to Carousel Driver

-1 - Socket error (call GetErrDesc() to get description of error)

APPENDIX C

1/4

Carousel Driver Interfaces

Overview

The Carousel Driver is an executable program that communicates directly with the carousel. Both customer and employee interface controls will communicate with the carousel via this driver. The "tag" is optional for process commands, but recommended for event processing by the ActiveX controls (Customer and Employee Interface).

Possible result message returned to controls:

- Operation complete
- In use by Customer
- In use by Employee
- Function not supported
- Cannot access database (specified in registry value CAROUSEL_DB)
- Bin ID incorrect format ("U000000B0000")
- Bin ID not found
- Bin Type not found
- Timed out while waiting for carousel result
- Carousel Out of Order
- Carousel Obstruction
- Obstruction cleared
- Communications error with carousel Registry values:

| | |
|---|---|
| CAROUSEL_COM_PORT | - Serial communications port number (i.e. "1" for COM1). |
| CAROUSEL_COM_SETTINGS | - Serial communications port settings in the format "baud rate, parity, bits, start bit" (i.e. "9600, n, 8, 1"). |
| CAROUSEL_DB | - Complete path and name of the carousel configuration database. |
| CAROUSEL_TIMEOUT | - Period to wait for carousel result before returning "timed out" error.<br>- If "0", then timeout is not used. |
| INACTIVITY_TIMEOUT | - Close socket communications with controls after specified time of inactivity.<br>- If "0", then timeout is not used. |

*Customer Interface:*

Close Doors

Send: "close[:tag] <cr>"
where tag = <optional>": ..."

Get Bin Infomation

Send: "getbininfo,[BinID] [:tag] <cr>"
where BinID = U000000B00000
tag = <optional>": ..."

Response: "U:xx, C:yy, S:ss, H:hh, W:ww, D:dd[:tag]<cr>"
where xx = Unit Number
yy = Carrier Number
ss = Shelf Number
hh = height (inches)
ww = width (inches)
dd = depth (inches)
tag = ": ..." (If provided)

Get Current State

Send: "getstate[:tag]<cr>"
where tag = <optional>": ..."

Response: "xx[:tag]<cr>"
where xx = {idle, busy, inuse}
tag = ": ..." (If provided)

APPENDIX C

2/4

Get Error Description

Send: "geterrordesc[:tag]<cr>"
where tag = <optional>": ..."

Response: "xx[:tag]<cr>"
where xx = Error Description Text
tag = ": ..." (If provided)

Get Max Bins

Send: "getmaxbins,[carrier],[shelf][:tag]<cr>"
where carrier = <optional> {1 ... Maximum number of carriers}
shelf = <optional> {1 ... Maximum number of shelves per carrier}
tag = <optional>": ..."

Response: "xx[:tag]<cr>"
where xx = Maximum number of bins per shelf (If [carrier] and [shelf] are specified.)
tag = ": ..." (If provided)
OR
where xx = Maximum number of bins in carousel
tag = ": ..." (If provided)

Get Max Carrier

Send: "getmaxcarriers[:tag]<cr>"
where tag = <optional>": ..."

Response: "xx[:tag]<cr>"
where xx = Maximum number of carriers
tag = ": ..." (If provided)

Get Max Shelves

Send: "getmaxshelves,[carrier][:tag]<cr>"
where carrier = <optional> {1 ... Maximum number of carriers}
tag = <optional>": ..."

Response: "xx[:tag]<cr>"
where xx = Maximum number of shelves per carrier (If [carrier] is specified.)
tag = ": ..." (If provided)
OR
where xx = Maximum number of shelves in carousel
tag = ": ..." (If provided)

Queue a Bin Location

Send: "que,[binID][:tag]<cr>"
where binID = U000000B00000
tag = <optional>": ..."

Open a Bin Location

Send: "retrieve,[binID],[time][:tag] <cr>"
where binID = U000000B00000
time = <optional>1-65 seconds, default = 30 seconds
tag = <optional>": ..."

Request Service

Send: "request[:tag] <cr>"
where tag = <optional>": ..."

APPENDIX C

3/4

*Employee Interface:*

Close Doors
Send: "close[:tag] <cr>"
where tag = <optional>": ..."

Get Bin Infomation
Send: "getbininfo,[BinID] [:tag] <cr>"
where BinID = U000000B00000
tag = <optional>": ..."

Response: "U:xx, C:yy, S:ss, H:hh, W:ww, D:dd[:tag]<cr>"
where xx = Unit Number
yy = Carrier Number
ss = Shelf Number
hh = height (inches)
ww = width (inches)
dd = depth (inches)
tag = ": ..." (If provided)

Get Current State
Send: "getstate[:tag]<cr>"
where tag = <optional>": ..."

Response: "xx[:tag]<cr>"
where xx = {idle, busy, inuse}
tag = ": ..." (If provided)

Get Error Description
Send: "geterrordesc[:tag]<cr>"
where tag = <optional>": ..."

Response: "xx[:tag]<cr>"
where xx = Error Description Text
tag = ": ..." (If provided)

Get Max Bins
Send: "getmaxbins,[carrier],[shelf][:tag]<cr>"
where carrier = <optional> {1 ... Maximum number of carriers}
shelf = <optional> {1 ... Maximum number of shelves per carrier}
tag = <optional>": ..."

Response: "xx[:tag]<cr>"
where xx = Maximum number of bins per shelf (If [carrier] and [shelf] are specified.)
tag = ": ..." (If provided)
OR
where xx = Maximum number of bins in carousel
tag = ": ..." (If provided)

Get Max Carrier
Send: "getmaxcarriers[:tag]<cr>"
where tag = <optional>": ..."

Response: "xx[:tag]<cr>"
where xx = Maximum number of carriers
tag = ": ..." (If provided)

APPENDIX C

4/4

Get Max Shelves

Send: "getmaxshelves,[carrier][:tag]<cr>"

where carrier = <optional> {1 ... Maximum number of carriers}
tag = <optional>": ..."

Response: "xx[:tag]<cr>"

where xx = Maximum number of shelves per carrier (If [carrier] is specified.)
tag = ": ..." (If provided)

OR where xx = Maximum number of shelves in carousel
tag = ": ..." (If provided)

Open a Bin Location

Send: "retrieve,[binID],[time][:tag] <cr>"

where binID = U000000B00000
time = <optional> 0-65 seconds, 0 => forever, default = 30 seconds
tag = <optional>": ..."

Open All Doors

Send: "openall[:tag] <cr>"

where tag = <optional>": ..."

Rotate Down one Carrier

Send: "rotatedown[:tag] <cr>"

where tag = <optional>": ..."

Rotate Up one Carrier

Send: "rotateup[:tag] <cr>"

where tag = <optional>": ..."

Rotate to Shelf

Send: "rotate,[carrier],[shelf][:tag] <cr>"

where carrier = {1 ... Maximum number of carriers}
shelf = {1 ... Maximum number of shelves per carrier}
tag = <optional>": ..."

What is claimed is:

1. A web enabled item delivery and retrieval system, comprising:

a storage subsystem including a secure storage facility accessible via software control employing browser technology by a first user who loads and stores an item into a storage location with a first identifier as to the storage location and a second identifier as to the identity of a second user, said second user then retrieving said item or returning an item upon using and entering certain information into an access terminal located on the storage facility; and a computer subsystem which controls the storage facility and having an application configurable software control architecture including a browser software interface including object-oriented programs comprising, a storage facility driver software interface for controlling access to the storage facility, a back office application program interface (BO API) enabling the first user to access the storage facility by means of the driver software interface, and a front office application program interface (FO API) enabling the second user to access the storage facility also by means of the driver software interface; and wherein said secure storage facility includes comprises a carousel and controls therefore, and including a plurality of storage bins normally hidden behind a closed door assembly including a plurality of doors, said doors being selectively opened on demand by either the first user via the back office application program interface (BO API) or the second user via the front office application program interface (FO API).

2. The system according to claim 1 wherein the carousel comprises a vertical carousel.

3. The system according to claim 1 wherein the first and second user commonly use said access terminal, said access terminal having a screen supporting a web page display.

4. The system according to claim 3 wherein the system comprises a single sided system where the carousel is accessed from a front side by both the first and second user.

5. The system according to claim 1 wherein the first and second user use separate access terminals, said terminals each having a screen supporting a web page display.

6. The system according to claim 5 wherein the system comprises a double sided system where the carousel is accessed from a rear side by the first user and from a front side by the second user.

7. The system according to claim 1 wherein the carousel provides access from a front side and wherein the door assembly includes a set of doors including at least one door on the front side of the carousel which is accessible only by the first user and at least one door on the front side of the carousel which is accessible only by the second user and wherein the common user access terminal is located on the front side of the carousel.

8. The system according to claim 7 wherein the carousel also provides access from a back side and wherein the door assembly includes at least one door on the back side which is accessible only by the first user.

9. The system according to claim 1 wherein the first user comprises an employee of a service company and the second user comprises a customer of the service company.

10. The system according to claim 1 wherein the first user comprises respective employees of a plurality of delivery service companies, said delivery service companies inserting respective application software into the computer subsystem which is executed in turn so to provide exclusive use of the storage facility at any one time by said plurality of delivery service companies.

11. The system according to claim 1 wherein said access terminal is located on a kiosk.

12. The system according to claim 11 wherein the kiosk houses the browser software interface.

13. The system according to claim 12 wherein the kiosk is located at the front of the carousel.

14. The system according to claim 13 wherein the kiosk supports a touch screen for inputting user access information.

15. The system according to claim 13 wherein the kiosk supports a signature pad for inputting a user signature.

16. The system according to claim 13 wherein the kiosk supports a bar code reader for inputting user bar code information.

17. The system according to claim 13 wherein the kiosk supports a card reader for inputting user card information.

18. The system according to claim 13 wherein the kiosk supports a PIN pad for inputting a user PIN number.

19. The system according to claim 13 wherein said kiosk supports a receipt printer for printing a user transaction receipt.

20. The system according to claim 1 and additionally including a wireless communications device for accessing the storage subsystem and the computer subsystem via a local area network.

21. The system according to claim 1 and additionally including a handheld wireless communications device for accessing the storage subsystem and the computer subsystem.

22. The system according to claim 1 and additionally including a wireless handheld communications device having a screen and incorporating a scanner for accessing the storage subsystem and the computer subsystem.

23. The system according to claim 1 wherein said software architecture additionally includes a security software interface for controlling a camera system for taking a picture of a user while interacting with the browser interface while at the storage subsystem.

24. The system according to claim 23 wherein the user comprises the second user.

25. The system according to claim 23 wherein the security software interface includes application interface controls.

26. The system according to claim 1 and additionally including an application and data web page server connectable to the browser interface.

27. The system according to claim 1 and additionally including an application and data web page server connectable to the browser software interface and a master web page server connectable to the application and data web page server which supports and stores one or more sets of web pages for said web page display.

28. The system according to claim 1 wherein the object oriented programs of the back office application program interface (BC API) implement functions in a basic carousel control architecture during an item loading operation, comprising:

a connect function which initializes connections of the object oriented programs of the back office application program interface to the driver software interface and passes an identification code thereto, if necessary, for access control;

an open all doors function gains full access to the carousel;

an open bin location function to position the carousel and open the doors to a specific bin;

a rotate carousel function which positions the carousel to a predetermined bin access point for a loading operation;

an identify bin function which is used to identify a particular bin when all the doors are open;

a close bin function which is used to close all the doors and, if necessary, clear all bin access codes; and a close all doors function which closes all doors and secures the carousel so as to complete an item loading transaction.

29. The system according to claim 1 wherein the object oriented program of the front office application program interface (FO API) implemented functions in a basic carousel control architecture during an item retrieval operation, comprising;

a connect function which initializes connections of the object oriented programs of the front office application program interface to the driver software interface and passes an identification code thereto, if necessary, for access control security;

a cue bin location function which rotates the carousel such that one requested bin is positioned behind a door of said door assembly without any of the doors being opened while an authentication process takes place;

an open bin location function to open said door to the requested bin for item retrieval; and a close bin function which is thereafter used to close said door so as to complete an item retrieval transaction.

30. A system according to claim 1 wherein the object oriented programs of the back office application program interface (BO API) implements functions during an item loading operation, comprising:

a connect function which initializes connection of the object oriented programs of the back office application program interface to the driver software interface;

a register item function which registers a specific item to be loaded in the carousel in an inventory database;

a purge item function which removes an item in the inventory database and clears a bin access code therefor;

a load item function which positions the carousel and opens a door of the carousel for a specific item at a specific location;

a removal item function which positions the carousel and opens the door to a specific item for removal and which is then marked as removed from the inventory database;

an open all doors function which is used to gain full access to the carousel;

an open bin location function similar to the load item function and positions the carousel to a specified bin and opens the doors thereto;

an identify bin function which identifies a particular bin when all the doors of the carousel are opened;

a rotate carousel function which is used to position the carousel to a specific access point;

a close bin function which is used to close the door for a specific bin location;

a close all doors function which is used to close all doors and secure the machine; and a database maintenance and report function to update the inventory database.

31. The system according to claim 1 wherein the front office application program interface (FO API) implements functions during a retrieval or return operation, comprising:

a connect function which initializes connections of the object oriented programs of the front office application program interface to the driver software interface;

a cue item and authenticate user function which rotates the carousel such that a requested item for retrieval is positioned behind a specific door without any of the doors being opened while a transactional process of authenticating the user takes place;

a remove item function which positions the carousel and opens a door to a specified item for retrieval;

a close bin function which is used to close doors of the carousel;

a load item function which positions the carousel and opens a door for return of a specified item at a specific bin location where the item is then registered in an inventory database;

a return item function which closes the door of the carousel upon return of an item to a specified bin and which is flagged in the inventory database for return;

a query item function to find and load time and status information into the inventory database; and a print receipt function to print a receipt of a transaction carried out by a user.

32. A web enabled item delivery and retrieval system, comprising:

a storage subsystem including a secure storage facility accessible by a first user who loads and stores an item into a storage location with a first identifier as to the storage location and a second identifier as to the identity of a second user, said second user then retrieving said item or returning an item upon using and entering certain information into an access terminal; and a computer subsystem which controls the storage facility and having a application configurable software control architecture including a software interface including object-oriented programs comprising, a storage facility driver software interface for controlling access to the storage facility, a back office application program interface (BO API) enabling the first user to access the storage facility by means of the driver software interface, and a front office application program interface (FO API) enabling the second user to access the storage facility also by means of the driver software interface; and wherein said secure storage facility includes comprises a carousel and controls therefore, and including a plurality of storage bins normally hidden behind a closed door assembly including a plurality of doors, said doors being selectively opened on demand by either the first user via the back office application program interface (BO API) or the second user via the front office application program interface (FO API);

wherein the back office application program interface (BO API) implements functions during an item loading operation, comprising:

a connect function which initializes connection of the application controls of the back office application program interface to the carousel driver;

a register item function which registers a specific item to be loaded in the carousel in an inventory database;

a purge item function which removes an item in the inventory database and clears a bin access code therefor;

a load item function which positions the carousel and opens a door of the carousel for a specific item at a specific location;

a removal item function which positions the carousel and opens the door to a specific item for removal and which is then marked as removed from the inventory database;

an open all doors function which is used to gain full access to the carousel;

an open bin location function similar to the load item function and positions the carousel to a specified bin and opens the doors thereto;

an identify bin function which identifies a particular bin when all the doors of the carousel are opened;

a rotate carousel function which is used to position the carousel to a specific access point;

a close bin function which is used to close the door for a specific bin location;

a close all doors function which is used to close all doors and secure the machine; and a database maintenance and report function to update the inventory database.

33. A web enabled item delivery and retrieval system according to claim 32 wherein the access terminal is located in a kiosk containing the software interface and wherein the kiosk is secured to the storage facility.

34. A web enabled item delivery and retrieval system, comprising:

a storage subsystem including a secure storage facility accessible by a first user who loads and stores an item into a storage location with a first identifier as to the storage location and a second identifier as to the identity of a second user, said second user then retrieving said item or returning an item upon using and entering certain information into an access terminal; and a computer subsystem which controls the storage facility and having a application configurable software control architecture including a software interface including object-oriented programs comprising, a storage facility driver software interface for controlling access to the storage facility, a back office application program interface (BO API) enabling the first user to access the storage facility by means of the driver software interface, and a front office application program interface (FO API) enabling the second user to access the storage facility also by means of the driver software interface; and wherein said secure storage facility includes comprises a carousel and controls therefore, and including a plurality of storage bins normally hidden behind a closed door assembly including a plurality of doors, said doors being selectively opened on demand by either the first user via the back office application program interface (BO API) or the second user via the front office application program interface (FO API);

wherein the front office application program interface (FO API) implements functions during a retrieval or return operation, comprising:

a connect function which initializes connections of the application controls of the front office application program interface to the carousel driver interface;

a cue item and authenticate user function which rotates the carousel such that a requested item for retrieval is positioned behind a specific door without any of the doors being opened while a transactional process of authenticating the user takes place;

a remove item function which positions the carousel and opens a door to a specified item for retrieval;

a close bin function which is used to close doors of the carousel;

a load item function which positions the carousel and opens a door for return of a specified item at a specific bin location where the item is then registered in an inventory database;

a return item function which closes the door of the carousel upon return of an item to a specified bin and which is flagged/marked in the inventory database for return;

a query item function to find and load time and status information into the inventory database; and a print receipt function to print a receipt of a transaction carried out by a user.

35. A web enabled item delivery and retrieval system according to claim 34 wherein the access terminal is located on a kiosk containing the software interface and wherein the kiosk is secured to the storage facility.

* * * * *